June 20, 1944. W. C. GOSCH 2,351,852
ELECTRODE HOLDER
Filed Feb. 16, 1943
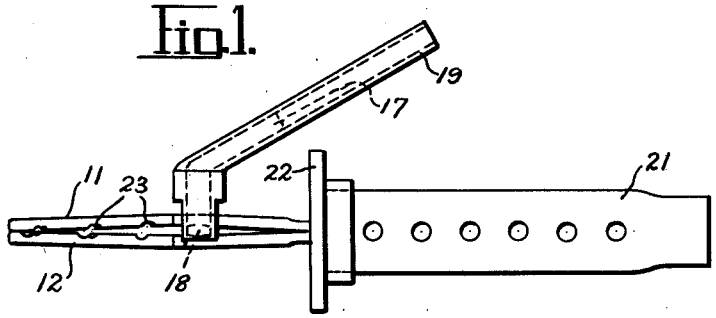
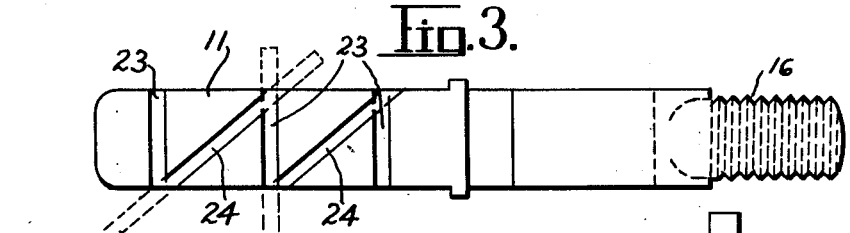
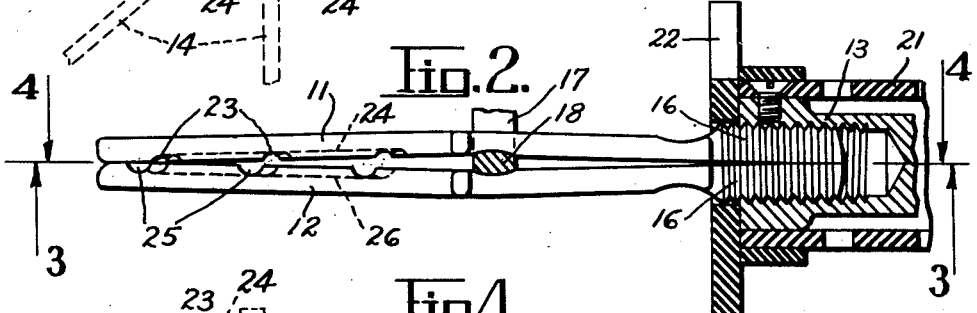
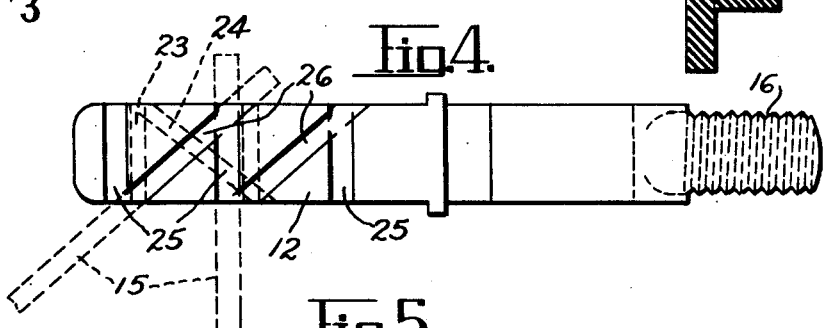
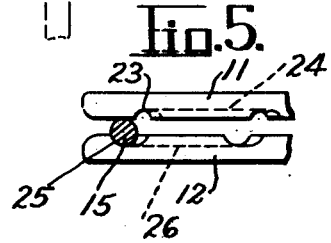
INVENTOR
Winkler C. Gosch.
BY
Walter S. Edwards
ATTORNEY Patented June 20, 1944

2,351,852

UNITED STATES PATENT OFFICE 2,351,852

ELECTRODE HOLDER

Winkler C. Gosch, Hamden, Conn., assignor of one-half to Martha S. Churchward and one-half to Myrlon A. Farnham, both of New Haven, Conn.

Application February 16, 1943, Serial No. 476,125

11 Claims. (Cl. 219—8)

This invention relates to electrode holders for use in electric arc welding, and more particularly to the construction of the electrode gripping jaws of such holders, whereby they will be adapted to more efficiently and securely grip the electrodes used therewith.

Electrode holders of the above type are used to grip welding electrodes in the form of elongated pencils the diameters of which may vary depending upon the class of work to be welded, and the welded joint or form of weld which is required. For instance where a comparatively large amount of metal is to be added or used in making the welded joint or weld an electrode relatively large in diameter is used, while an electrode, relatively small in diameter, is used when a comparatively small amount of metal is required such as when small and delicate parts are to be welded.

One object of this invention is to provide in an electrode holder of the above type electrode holding means of such structure that electrodes of various diameters may be efficiently and securely held.

Another object of this invention is to provide in an electrode holder cooperating and opposed electrode holding jaws of such form that comparatively good electrical contact will be made between them and welding electrodes of different diameters.

A further object of this invention is to provide a pair of cooperating welding electrode gripping jaws of such form that a comparatively good electrical contact will be made between a first one of the jaws and an electrode, relatively small in diameter, when the electrode is pressed thereagainst by the first one of said jaws.

A still further object of this invention is to provide an improved electrode holder for welding electrodes, which will be relatively simple in construction, inexpensive to manufacture, readily manipulated, compact, and very efficient and durable in use.

With these and other objects in view, which will appear as the description proceeds, there has been illustrated in the accompanying drawing one form in which the features and principles of this invention may be conveniently embodied in practice.

In the drawing:

Figure 1 is a side view of an electrode holder in which the features and principles of this invention are embodied;

Figure 2 is a longitudinal sectional view through the electrode holding portion of the holder illustrated in Figure 1 with the electrode gripping jaws unsectioned for the purpose of more clearly showing their construction;

Figure 3 is a face view of one of the jaws looking in the direction of arrows 3—3 in Figure 2 and showing the structure thereof whereby the jaws will efficiently grip an electrode relatively small in diameter;

Figure 4 is a face view of the other of the jaws looking in the direction of arrows 4—4 in Figure 2 and showing the structure thereof whereby the jaws will efficiently grip an electrode relatively large in diameter; and Figure 5 is a broken side view of the jaws holding an electrode of one diameter.

The electrode holder selected to illustrate the features and principles of this invention is one in which cooperating electrode gripping jaws 11 and 12 extend from a core member 13, which core member is adapted to have an electric cable secured thereto, not shown herein but which may be of the form as fully described and shown in Churchward Patent No. 2,301,107, dated November 3, 1942. Means is also provided whereby the jaws 11 and 12 are under spring tension to constantly urge them together to grip different diameter electrodes 14 and 15 therebetween. In this instance the spring tension urging the jaws together is obtained by slightly bowing the jaws away from each other intermediate their ends so that when a threaded end 16 of each is screw-threaded together into the core member 13 the electrode holding portions of the jaws will be springably urged toward each other.

The spring pressed jaws 11 and 12 may be separated to receive an electrode by pressing downwardly upon a handle 17, which has a bar cam portion 18 disposed between the jaws 11 and 12 intermediate their ends and adapted when rocked by the handle 17 to cam the jaws apart. The handle 17 is preferably insulated by having a tube 19 of insulating material covering the same. In this instance, the core member 13 is covered by a tube of insulating material 21, which also forms a handle for the device. A guard plate 22 is also provided to protect the user's hands.

In order to adapt the jaws 11 and 12 to efficiently grip welding electrodes of different diameters therebetween a first one, the jaw 11, is provided with a plurality of grooves 23, in this instance three, which extend completely and transversely across, and are spaced apart lengthwise of, the jaw 11. Other grooves 24 are provided in the jaw 11 extending diagonally across this jaw from one side thereof to the other, preferably from an end of one of the grooves 23 at one side of the jaw 11 to an end of the next groove 23 at the other side of this jaw. The surface of the jaw 11 between the grooves is substantially flat. The grooves 23 and 24 are preferably arcuate in cross-section, the radius of this arcuate form being substantially the same as that of a standard size of a relatively small diameter welding electrode, for instance one which is one-eighth, or three-thirty seconds, of an inch in diameter.

The other, or second one, 12 of said cooperating jaws is provided with a plurality, herein three being shown, of grooves 25, which extend completely and transversely across, and are spaced apart lengthwise of, the jaw 12. Other grooves 26 are provided in the jaw 12 extending diagonally across this jaw from one side thereof to the other, preferably from an end of one of the grooves 25 at one side of the jaw 12 to an end of the next groove 25 at the other side of this jaw. The surface of the jaw 12 between the slots is substantially flat. The grooves 25 and 26 are preferably arcuate in cross-section, the radius of this arcuate form being substantially the same as that of a standard size of a relatively large diameter welding electrode, for instance one which is one-quarter, or five-sixteenths, of an inch in diameter.

While welding electrodes which are round in cross-section are generally used in electric welding, it is to be understood that the principles and features of this invention will equally apply to electrodes of other cross-sectional shapes, for instance, those which are square, or oval, in cross-section and therefore it is desired that this invention is not to be limited to the grooves 23, 24, and 25, 26 being arcuate in cross-section. In other words, this invention applies in its broadest aspect to electrode holders having cooperating gripping jaws of which a first one is provided with grooves arranged therein, as are the grooves 23 and 24, but of a cross-sectional shape corresponding to the cross-sectional form of a relatively small electrode, and of which a second one is provided with grooves arranged therein, as are the grooves 25 and 26, but of a cross-sectional shape corresponding to the cross-sectional form of a relatively large electrode.

As indicated by dotted lines in Figure 4 the transverse grooves 23 provided in the first jaw 11 are spaced slightly out of transverse alignment with the transverse grooves 25, provided in the second jaw 12, and the diagonal grooves 24 in the jaw 11 across the diagonal grooves 26 in the jaw 12 when these jaws 11 and 12 are assembled together in cooperating operative position, as shown in Figures 1 and 2. In view of this novel arrangement an electrode 14 will be firmly seated in the selected groove 23 or 24 in the jaw 11 and in good electrical contact therewith when the handle 17 is released to permit the jaws to close together, the overlying flat surface of the jaw 12 pressing the electrode 14 into the selected groove 23 or 24. In like manner an electrode 15 will be firmly pressed into the selected groove 25 or 26 provided in the jaw 12 to make a good electrical contact therewith, when the handle 17 is released to allow the jaws to close and the overlying flat surface of the jaw 11, to press the electrode 15 into the selected groove 25, or 26.

Preferably the grooves 23 and 24 are formed in the jaw 11 to a depth slightly less than the radius, or thickness, of the electrode to be held, so that a still smaller electrode may be securely gripped between the jaws 11 and 12, while seated in the selected groove 23 or 24. Likewise the grooves 25 and 26 are preferably formed in the jaw 12 to a depth slightly less than the radius, or thickness, of the electrode to be held, so that a smaller than the maximum size of electrode may be gripped between the jaws 11 and 12, while seated in the selected groove 25, or 26.

While there has been disclosed in this application one form in which the invention may be embodied, it is to be understood that the invention may be embodied in other forms without departing from the spirit or essential attributes thereof and it is, therefore, desired that the present embodiment be considered in all respects as illustrative, and not restrictive, reference being had to the claims rather than to the foregoing description to indicate the scope of the invention.

Having thus fully described the invention, what is claimed as new and for which is desired to secure Letters Patent, is:

1. In an electrode holder having a pair of operable cooperating jaws adapted to hold a welding electrode therebetween, a first one of said jaws having a groove extending transversely across the same from one side to the other and adapted to have an electrode of relatively small cross-section seated therein and a flat face adjacent the slot therein, and the second one of said jaws having a groove extending transversely across the same from one side to the other and adapted to have an electrode of relatively large cross-section seated therein and a flat face adjacent the groove therein, the groove in the first jaw being out of alignment with the groove in the second jaw when said jaws are in cooperating relation to grip an electrode therebetween.

2. In an electrode holder having a pair of operable cooperating jaws adapted to hold a welding electrode therebetween, a first one of said jaws having grooves extending transversely across the same from one side to the other, and a substantially flat face between the grooves therein, the second one of said jaws having grooves extending transversely across the same from one side to the other, and a substantially flat face between the grooves therein, the grooves in one jaw being out of alignment with the grooves in the other jaw and cooperating with the flat faces between the grooves in the other jaw when said jaws are in cooperating operative position to grip an electrode in a groove and against the flat face cooperating with this groove.

3. In an electrode holder having a pair of operable cooperating jaws adapted to hold a welding electrode therebetween, a first one of said jaws having grooves extending transversely across the same from one side to the other and adapted to have an electrode of relatively small cross-section seated therein, a groove extending diagonally across the first jaw between the transverse grooves, the second one of said jaws having grooves extending transversely across the same from one side to the other and adapted to have an electrode of relatively large cross-section seated therein, a groove extending diagonally across the second jaw between the transverse grooves, the diagonal grooves in the first and second jaws crossing each other when said jaws are in cooperating operative position to grip an electrode therebetween.

4. In an electrode holder having a pair of operable cooperating jaws adapted to hold a welding electrode therebetween, a first one of said jaws having grooves extending transversely across the same from one side to the other, a groove extending diagonally across the first jaw between the transverse grooves and adapted to have an electrode of relatively small cross-section seated therein, the second one of said jaws having grooves extending transversely across the same from one side to the other, a groove extending diagonally across the second jaw between the transverse grooves and adapted to have an electrode of relatively large cross-section seated therein, the transverse grooves in one jaw being slightly out of alignment with the grooves in the other jaw and the diagonal grooves in said jaws crossing each other, when said jaws are in cooperating operative position to grip an electrode therebetween.

5. A pair of cooperating jaws for an electrode holder each of said jaws having spaced apart transverse grooves in their opposing surfaces, and a diagonal groove extending thereacross, the transverse grooves in one jaw being out of transverse alignment with the transverse grooves in the other jaw, and the diagonal groove in one jaw crossing the diagonal groove in the other jaw.

6. A pair of cooperating jaws for an electrode holder each of said jaws having spaced apart transverse grooves in their opposing surfaces, and a diagonal groove extending thereacross, the transverse grooves in one jaw being out of transverse alignment with the transverse grooves in the other jaw, and the diagonal groove in one jaw crossing the diagonal groove in the other jaw, the transverse and diagonal grooves in one jaw being wider and deeper than the transverse and diagonal grooves in the other jaw.

7. A pair of cooperating jaws for an electrode holder each of said jaws having spaced apart transverse grooves in their opposing surfaces, the grooves in one jaw being out of alignment with the grooves in the other jaw, the grooves in one jaw being adapted to receive an electrode of smaller diameter than are the grooves in the other jaw.

8. A pair of cooperating jaws for an electrode holder each of said jaws having spaced apart transverse grooves in their opposing surfaces, and a diagonal groove extending thereacross, the transverse groove in one jaw being out of transverse alignment with the transverse grooves in the other jaw, and the diagonal groove in one jaw crossing the diagonal groove in the other jaw, the transverse and diagonal grooves in one jaw being adapted to receive an electrode of larger diameter than are the transverse and diagonal grooves in the other jaw.

9. A pair of cooperating jaws for an electrode holder, each of said jaws having transverse grooves separated by flat faces provided in their opposing surfaces, the grooves in one jaw being adapted to receive an electrode smaller in cross-section than are the grooves in the other jaw and being in opposed relation with the flat faces between the grooves in the other jaw.

10. A pair of cooperating jaws for an electrode holder, each of said jaws having transverse grooves separated by flat faces provided in their opposing surfaces, the grooves in one jaw being in opposed relation with the flat faces between the grooves in the other jaw.

11. A pair of cooperating jaws for an electrode holder, each of said jaws having diagonal grooves provided therein, the grooves in one jaw crossing the grooves in the other jaw and being adapted to receive an electrode of larger cross-section than are the grooves in the other jaw.

WINKLER C. GOSCH.